United States Patent [19]

Armand

[11] Patent Number: 4,790,549
[45] Date of Patent: Dec. 13, 1988

[54] TRANSPORT DEVICE

[75] Inventor: Bjorn Armand, Hagersten, Sweden

[73] Assignee: Stubinen Utveckling AB, Sweden

[21] Appl. No.: 43,943

[22] Filed: Apr. 29, 1987

Related U.S. Application Data

[63] Continuation-in-part of Ser. No. 781,123, Sep. 26, 1985, abandoned.

[30] Foreign Application Priority Data

Sep. 26, 1984 [DE] Fed. Rep. of Germany ... 8428334[U]

[51] Int. Cl.$^4$ .............................................. B62B 11/00
[52] U.S. Cl. ................................. 280/47.18; 211/186; 280/47.26; 280/47.35; 280/79.3
[58] Field of Search .............................. 211/186, 189; 280/47.18, 47.19, 47.2, 47.24, 47.26, 47.35, 47.17, 79.3

[56] References Cited

U.S. PATENT DOCUMENTS

| | | | |
|---|---|---|---|
| 1,006,985 | 10/1911 | Smith | 280/47.18 X |
| 1,807,913 | 6/1931 | Hollowood | 414/456 |
| 1,890,390 | 12/1932 | Lamb | 280/47.24 X |
| 2,466,149 | 4/1949 | Burg | 280/47.28 X |
| 2,521,819 | 9/1950 | Baer | 280/35 |
| 2,739,007 | 3/1956 | Rauterberg | 280/47.24 X |
| 3,398,981 | 8/1968 | Vincens | 211/186 X |
| 3,815,767 | 6/1974 | Lund et al. | 414/456 |
| 4,363,496 | 12/1982 | Schreiner | 280/47.35 |
| 4,391,454 | 7/1983 | Marsh et al. | 211/186 X |
| 4,491,226 | 1/1985 | Marschak | 211/186 |

Primary Examiner—John J. Love
Assistant Examiner—Michael Mar
Attorney, Agent, or Firm—Andrus, Sceales, Starke & Sawall

[57] ABSTRACT

A transport device includes two substantially rectangular frames, each movable on wheels. The wheels of one frame have a fixed horizontal axis and the wheels of the other may be on swivel connection. At least one container is detachably secured at the top edge and bottom edge to each flat side of said frames. The frames include side members and one or more cross members. The bottom member includes an outwardly projecting ledge as a container support on which the container bottom edge rests. The bottom ledge and the container may have interconnecting openings and projections to prevent lateral movement. A container retaining or securement unit is secured to the upper end of the frames and includes a movable fish-plate or hook unit which hooks over the container top edge. Each frame may include a bottom section including the wheels, a bottom container support and upper securement unit, and an upper section releasably secured to the bottom section to form an extended frame. The upper section includes support units for supporting a container, a slab or the like. The frame sections may be provided with openings to receive a handle for movement of the transport device. The transport device including the multiple sectioned frames may be taken apart for transport and then assembled on-site for use.

13 Claims, 5 Drawing Sheets

TRANSPORT DEVICE

This application is a continuation-in-part of an application filed by Bjorn Armand entitled TRANSPORT DEVICE, filed on Sept. 26, 1985 with Ser. No. 06/781,123 now abandoned.

BACKGROUND OF THE INVENTION

The innovation is directed to a device for the transport of small articles.

It is the object of the present innovation to facilitate the transport of such articles by means of an extremely simple transport device.

SUMMARY OF THE INVENTION

In accordance with the invention, a pair of similar frames are releasably coupled by one or more containers. The frames are provided with movable rollers or wheels for creating a movable transport device which is readily assembled and disassembled. The frames and the container thereby form a mobile unit, wherein the frame in accordance with the innovation is an easily handled flat frame and above all occupies little space in transport vehicles or storage areas. The frame may be a very light contruction and in an extreme case the frame comprises a longitudinal and a transverse strut forming a cross-like structure. However, it is preferred each frame comprises at least two relatively spaced longitudinal struts extending approximately parallel to one another and at least two transverse structs likewise relatively spaced and extending transversely to the former struts. Each frame includes a bottom support and an upper locking and retaining support for releasable coupling to the bottom edge and the top edge of the container.

The container, which is adapted to be secured to the frames forms the receiving or loading portion of the transport unit. This loading unit is variable in accordance with the configuration of the container. Preferably, the frame and especially the connection portions thereof and the container, are matched to commonly used crate-like containers of plastics or the like.

The bottom strut or support and the aligned portion of the container may be formed with various further interlock elements. For example, a lower L-shaped strut may be formed with one or more upstanding projections which mate with correspondingly located openings in the container. The strut may be U-shaped, with the outer leg mating with a slot or recess in the container. Similarly, the upper locking unit may be of a various construction. Generally, the upper locking unit includes a construction which requires positive movement of a locking element into and from locking engagement with the container. Further, each side frame may be formed with separable top and bottom sections to permit forming of different sizes of the transport devices at the site.

Assembly and disassembly of the frames and the transport devices is extremely easy. In the disassembled state only minimum space is required for parking such a transport or container truck.

Further structural details are described in detail hereinafter and are directed to an especially simple means for securing the container to one flat side of the square or similar frames, and further to the interconnection to forming a container truck including the two frames and at least one container.

BRIEF DESCRIPTION OF THE DRAWINGS

Below, preferred embodiments of the transport device according to the innovation will be described in detail with reference to the accompanying drawings, in which.

DESCRIPTION OF THE ILLUSTRATED EMBODIMENTS

Figure 1:
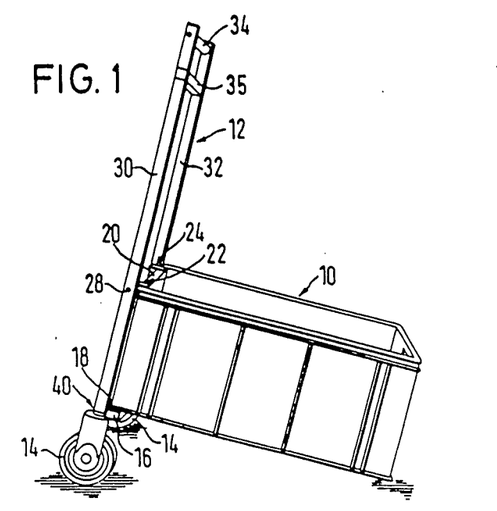
FIG. 1 shows the transport device according to the innovation, configured like a wheelbarrow, in the rest position.
Figure 2:
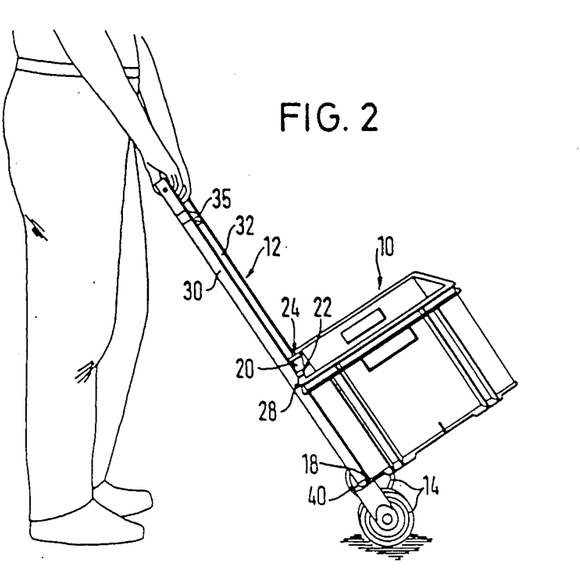
FIG. 2 is the transport device of FIG. 1 in the transport or push position.
Figure 3:
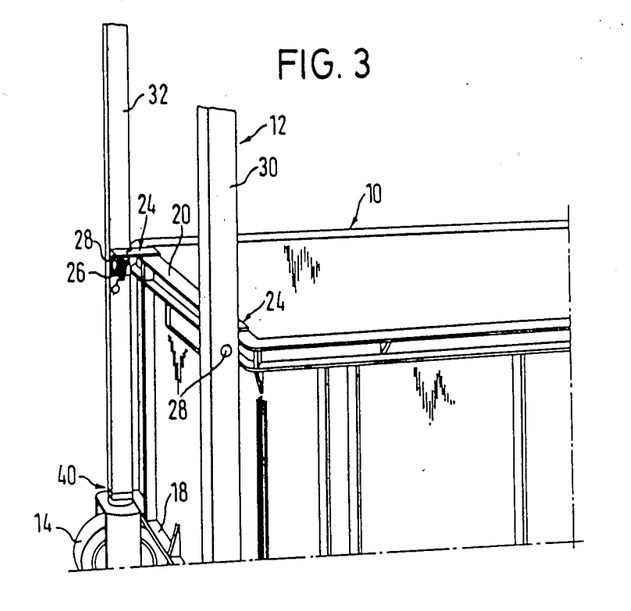
FIG. 3 illustrates an enlarged-scale detail of the transport device of FIGS. 1 and 2.
Figures 3A, 7:
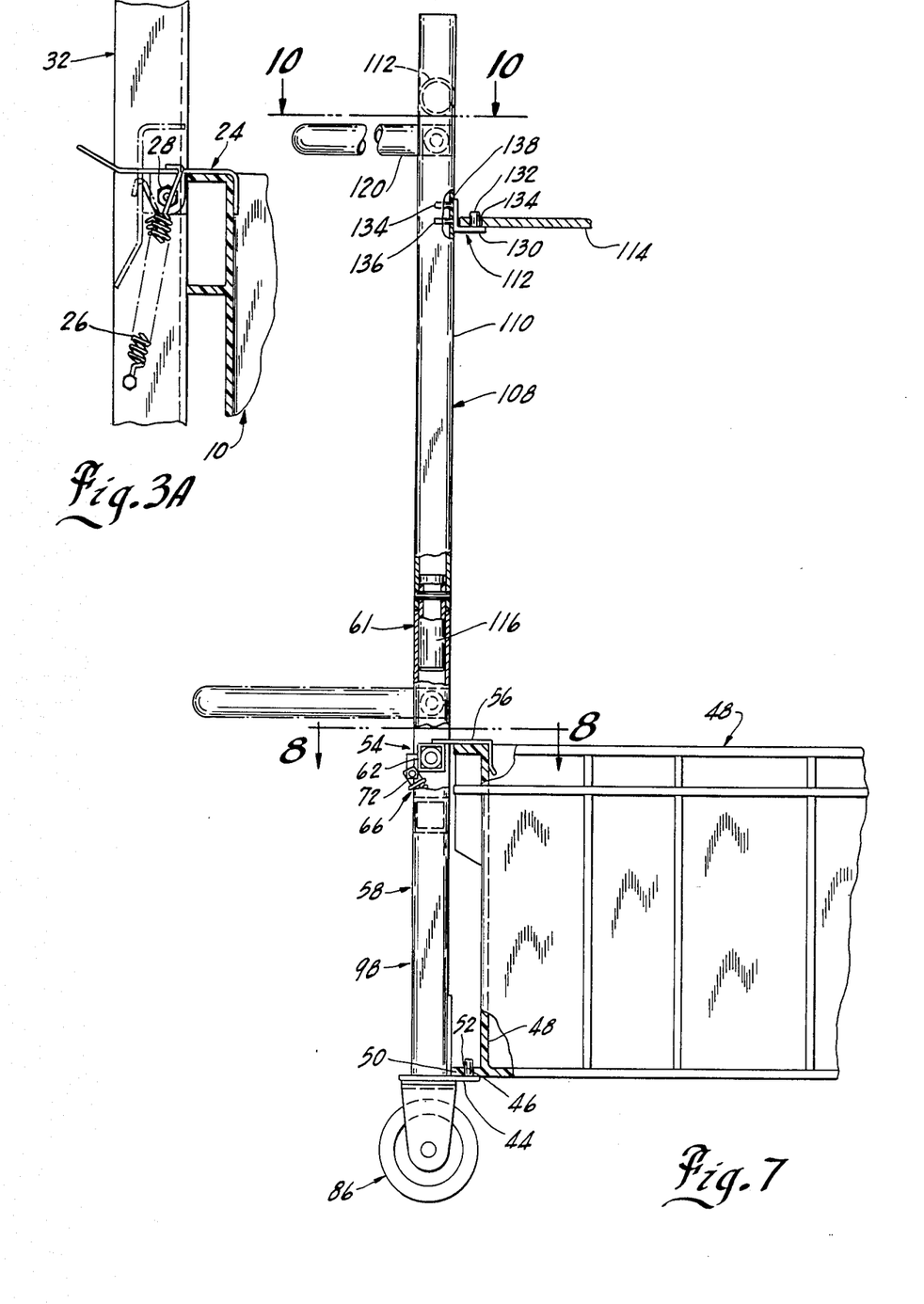
FIG. 3A is an enlarged fragmentary view more clearly illustrating the fish-plate unit and the bottom support strut shown in FIG. 3.
FIG. 7 is a view similar to FIG. 4 and illustrates an alternate embodiment of a transport device.

The transport device shown in FIGS. 1 to 3 comprises a square frame 12 movable on two wheels 14, a container 10 detachably mounted thereon and projecting therefrom. As will be apparent from FIGS. 1 to 3, the container 10 is secured to one flat side of the square frame 12. The frame 12 is formed by two relatively spaced longitudinal struts 30, 32 extending in parallel to one another and by three transverse struts 16, 34, 35 which extend transversely to said longitudinal struts and are likewise spaced from one another. The bottom transverse strut 16, which is closest to the wheels 14, at the same time serves as a container support associated with the lower edge 18 of the container 10. To this end the bottom transverse strut 16 protrudes somewhat from the connecting side of the frame 12 beyond the plane thereof, and my for example be a simple L-shaped plate having one leg welded to the struts 30, 32 and the other protruding from the frame, and thereby the container 10 connected to the frame 12 has the lower frame-side edge 18 supported in the downward direction. The upper edge 20 of the crate-like plastics container 10 has a container retaining unit associated therewith. The retaining unit includes retaining hooks 22, 24 pivotably mounted on the two longitudinal struts 30, 32. Each of the retaining hooks 22, 24 is formed by a fishplate that is bent about approximately 90°, as more clearly shown in FIG. 3A. These fishplates are each mounted on both longitudinal struts 30, 32 as by a pivot unit for pivoting movement about an axis 28 extending transversely or approximately parallel to the upper edge 20 of the container 10, wherein the fishplates are adapted to be held by means of tension springs 26 in a retaining position, as shown in FIGS. 3 and 3A, in which the fishplates engage about the upper container edge 20, and may be moved against the action of the springs 26 into a container-releasing position, as shown in phantom in FIG. 3A. The tension springs 26 are mounted, on the one hand, on the respective longitudinal struts 30, 32 beneath the pivot axes 28 and, on the other hand, on the fishplates 22, 24 between the respective axis 28 and the upper containers edge 20. Preferably, both fishplates 22, 24 are joined to one another by means of a connecting bar, not shown, such that they can be operated jointly by means of the connecting bar and especially can be moved into the container-releasing position.

Figure 6:
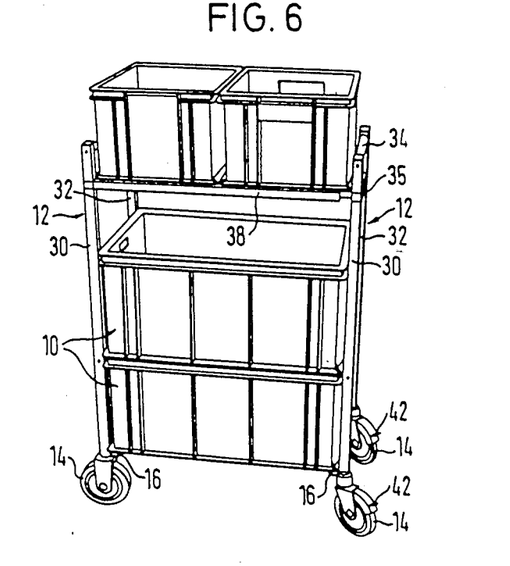
FIG. 6 shows the container truck of FIG. 5 including two containers stacked upon one another below the connecting plate and two containers placed side-by-side on the connecting plate.
Figure 8:
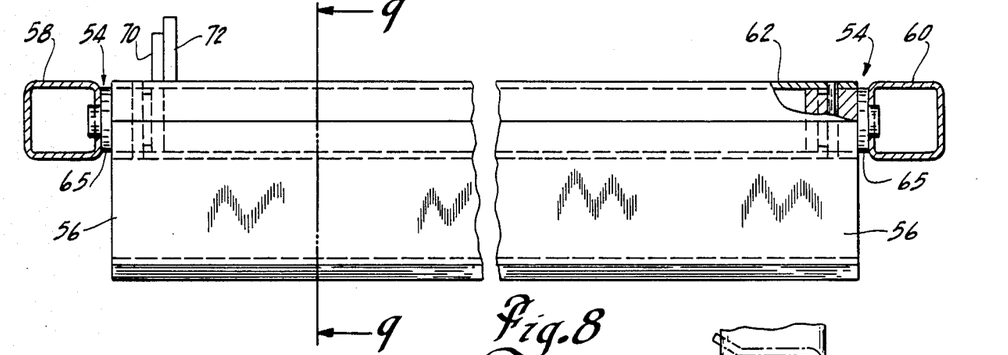
FIG. 8 is a plan view of a container securement and retaining unit shown in FIG. 7.

The fishplate locking unit is preferably constructed to latch the locking plate in the alternate release position and locking position. One locking construction of a fishplate unit is shown in FIGS. 3 and 3A wherein a coil spring 26 is secured to the strut 32 adjacent the back side and to the fishplate 24 adjacent the front side of the frame strut 32. The pivot has its unit 28 of the fishplate unit 24 located between such attachment location, and the spring 26 thus functions as an over-center spring to hold the fishplate in the release position and alternately in the locking position. As will be specifically apparently from FIG. 3, the retaining hooks 22, 24 formed as angled fishplates rest in the container retaining position with their respective flat surfaces on the upper container edge 20, as shown more clearly in FIG. 3A, so that thereby a stacking of two or more containers 10 (for example as illustrated in FIG. 6) is not obstructed. The spacing of the angled fishplate-type retaining hooks 22, 24 from the bottom supporting strut 16 correspondings approximately to the level of the container 10 that is to be connected thereto.

In order to provide for matching to different container heights, either the supporting strut 16 and/or the retaining hooks 22, 24 may be leveladjustable, i.e., they may be disposed for adjustment in the direction of the longitudinal struts 30, 32. For example, the side or longitudinal struts may be provided with vertically spaced openings and the hooks 22, 24 releasably but firmly mounted in the openings.

The uppermost transverse strut 34 also serves as a handle. The wheels 14, which are respectively provided on the bottom end of the longitudinal struts 30, 32, are mounted for rotation about axes that extend in parallel to the longitudinal struts 30, 32. In FIG. 3, this pivot bearing is referenced 40.

The longitudinal and transverse struts 30, 32 and 16, 34, 35, respectively, are preferably made of square or tubular sections of aluminium or a similar light material.

Figure 4:
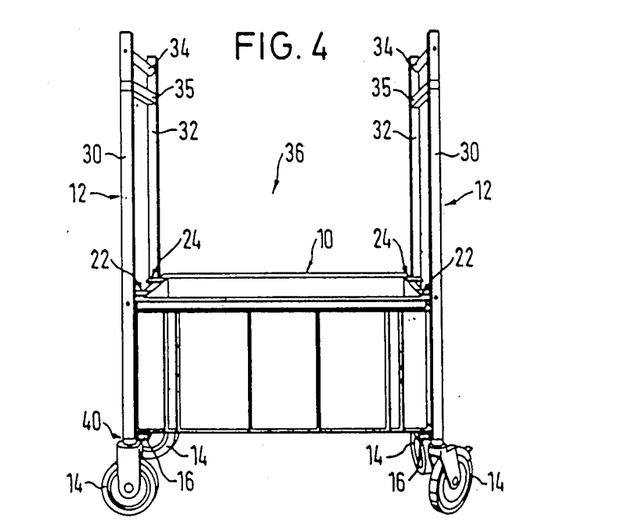
FIG. 4 illustrates a transport device that has been completed to form a container truck by the use of two square frames shown in FIGS. 1 and 2.
Figure 5:
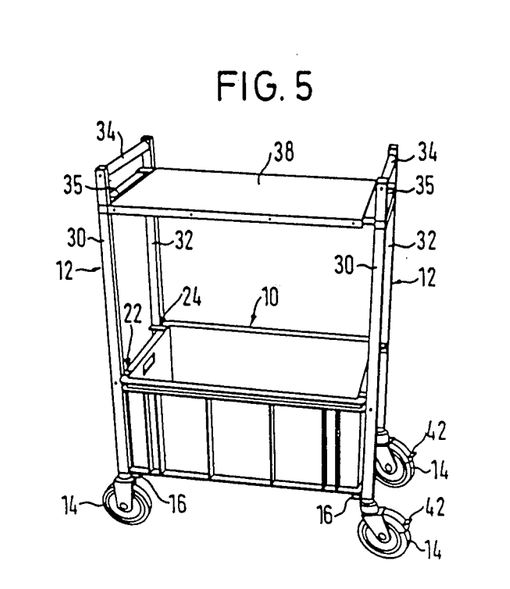
FIG. 5 shows the container truck of FIG. 4 with an upper connecting plate to be used as receiving surface.

FIGS. 4 through 6 illustrate a container truck 36 which is constructed by two frames 12 of the above-specified kind and a container 10 disposed therebetween (FIG. 4) and firmly joining the frames to form the transport device. In the embodiment shown in FIG. 5, the upper portions of the two frames 12 of the container truck are joined to one another by means of a connecting slab 38 and are held in spaced relationship. The slab 38 is used as receiving surface for additional containers, as will be apparent from FIG. 6. The slab 38 is connected to the respective transverse struts 35 of the two frames 12. The transverse struts 35 are provided at a slight spacing below the uppermost transverse strut 34 which is used as handle. In a practical embodiment, this spacing amounts to about 10 to 15 cm.

In the embodiment shown in FIG. 6, two containers 10 are stacked upon each other below the connecting slab 38.

The wheels 14 of one of the frames 12 may be provided with conventional wheel brakes. These are indicated by 42 in FIG. 5 and FIG. 6, respectively.

It may be advantageous particularly for the embodiment shown in FIGS. 1 to 3 when the frame 12 is provided with plural retaining hooks 22, 24 provided above each other and respectively associated with the upper edges of stacked containers. In respect of the embodiment shown in FIGS. 4 to 6, this is not a requirement when the containers 10 have appropriate configuration, because the upper container is secured against lateral displacement by the lower container. The top peripheral edge of the lower container embraces the bottom edge of the upper container.

Although the simple pivoted fishplate and flat bottom ledge provide a satisfactory support, other systems and modifications can also be provided.

For example, the frames may be formed with a bottom strut or ledge 44 provided with a one or more upstanding pins 46 as shown in the embodiment of FIG. 7. The container 48 is formed with a bottom ledge 50, preferably outwardly projecting, having openings 52 adapted to be aligned with the upstanding pins 46. In assembly, the upper securement or retaining unit 54 is released to allow the free entrance and removal of the container 48. The container 48 is then placed into position with the openings 52 aligned with and passed downwardly over the pins 46 to thereby positively lock the bottom of the container to the lower strut. The upper latch unit 54 is then moved to the retaining position and positively engages the upper end of the container 48 to secure it in position.

The upper retaining latch mechanism can of course also be modified from the specifics of the hook shaped fishplate shown in FIGS. 1–6. For example, in the embodiment shown in FIG. 7, the upper container securement unit 54 is shown as a generally L-shaped plate member 56 extending completely between the side struts 58, 60 of a frame 61. The L-shaped plate member 56 is located in an inverted L configuration with a generally horizontal plate secured to a square tubular pivot member 62 extending between the side struts 58 and 60. The opposite ends of the pivot member 64 include similar pivot units 65 which extend into openings in the side frame members or struts 58, 60 to pivotally support the unit 54 and particularly plate member 56. The L-shaped plate member 56 include a retaining securement unit 66 for locking of the unit in the container retaining position.

Figure 9:
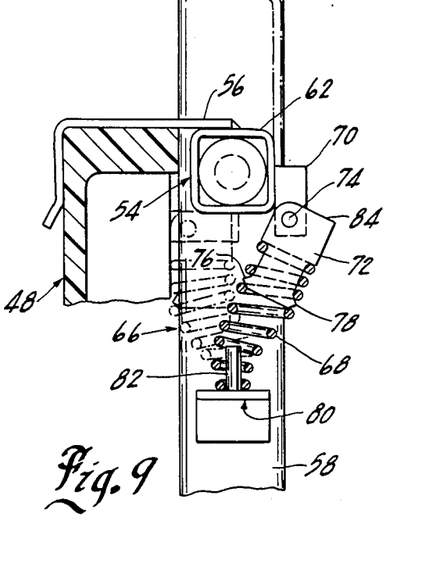
FIG. 9 is an enlarged fragmentary view illustrating the retaining unit of FIGS. 7 and 8.

In constrast to the tension springs of the previous embodiment, the unit 66 is formed with suitable compression coil springs 68, as shown in FIGS. 7 and 9. A latch arm 70 is secured to the back side of the pivot member 62 and projects downwardly slightly thereof. A spring arm 72 is pivoted to the latch arm 70 as by a pivot pin 74. The compression coil spring 68 is secured over the arm 72 and locked thereon by suitable lateral end projections 76, 78 on the pivot arm. A spring support wall 80 is secured to the side frame strut 58 and includes an upwardly extending spring guide pin 82. The opposite or outer end of the coil spring 68 is telescoped over the pivot pin 82 and abuts the wall 80. The spacing between the support wall 80 and the coil support portion of the pivot arm 72 is less than the length of the coil spring 68 in an unstressed state. The coil spring 68 is continuously compressed and provides a continuous force on the pivot arm 70 and interconnected pivot plate member 56.

With the plate member 56 pivoted upwardly to the release position, the arm 70 extends horizontally and the spring force is applied to the side of the pivot shaft 63 to latch the plate in position. Thus, the pivot arm 72 pivots downwardly to the vertical position with the upper edge 84 of the arm 72 abutting the pivot member 62. The coil spring 68 is now compressed between the pivot arm 72 and the support wall 80 to the inner side of the pivot shaft 63 and releasably locks the plate member 62 in the raised release position.

When the locking plate 56 is pivoted downwardly, it pivots the interconnected arm 70 and arm 72 to the full line position of FIG. 9. The arm 72 further compresses the coil spring until such time as the pivot pin 74 moves passed the pivot shaft 63. The corner of the bracket member 56 pivots on the upper edge of the pivot arm 72 and as it moves past the center point the arm 72 pivots outwardly to the final position as shown in full line FIG. 9. In this position, the coil spring 68 is deflected to the back side of the frame and urges the arm 70 and interconnected member 62 and plate 56 to pivot in a counterclockwise direction, as viewed in FIG. 9, to lock the plate 56 in the holding position.

The side frames in the embodiment of FIG. 7, as in FIG. 4, is formed with a combination of the first frame 61 having wheel 86 fixed to establish fixed horizontal axis of rotation extending laterally across the frame and rotatable about a vertical axis. The second frame, not shown, may be provided with swivel mounted wheels, as in the previous embodiment. The combination of the fixed axis wheels and the swivel wheels provide for convenient movement of the truck along either a straight line, or turning as desired and/or necessary.

In the several embodiments, the lower support structure is provided with a quick interreleasable engagement while the upper end securement unit is preferably provided with a corresponding spring or other type of a forced latched mechanism to positively establish a firm and reliable mounting of the container within the frame structure. In the prior embodiments, the frames are similarly formed as single, integral units and the assembly includes releasable latches for coupling of the upper ends of the containers to the mobile frames. Within the broadest aspect of the invention, the transport device may be formed with other forms of retaining units and with the frames constructed to permit changing of the size of the transport device. Each frame may be desirably formed as a multiple part stacked assembly permitting customer adjustment of the orientation and sides of the frame structure for receiving one or more containers. For example, such as shown in FIG. 7, the side frames in this embodiment are each similarly formed as multiple part frames. Each side frame is similarly constructed consists of a two part assembly which is formed as a quick breakaway kit for transport and convenient onsite assembly at the operating location to another.

The side frame is shown in the embodiment as having two spaced tubular longitudinal frame members. A lower section 98 is provided with the wheels, which may include the fixed wheels 86 in the one side frame 58. The lower section 98 includes the bottom support strut 44 secured to the lower ends of the tubular side struts 58 and 60. The support strut 44 is a plate member having a greater width than the struts 58. The wheels 86 having mounted plates secured to the strut 44. Pins 46 project from the strut to receive the container 48. In addition, the lower section 98 extends upwardly to at least a first upper level with the securement unit 54 for securing of a container 48 between the side frames and with the container resting on the bottom strut 44. The upper end of the lower section 98 is exposed and is adapted to receive an upper section 108. The upper section is shown as a generally H-shaped section, which includes a pair of side frame struts 110 and an upper cross member 112. The upper section 108 may be provided with a securement unit, not shown, or with bottom container supports 112 for receiving supporting slab or plate or a relatively small container 114 in location without the necessity for an upper latch mechanism.

The side frame struts 110 of the upper section 108 includes extended coupling legs 116 telescoped into the lower end of the side frame struts 110 and extending therefrom. The legs 116 are adapted to project downwardly into the upper ends of the side struts 58, 60 of the lower section 98. The extent of the legs extension is selected to provide a firm interlock of the side frame struts and therefore the sections 98 and 108 to each other to maintain a firm reliable interconnection and vertical frame structure. A pressure fit or releasable latch units, not shown, may be provided to releasably lock the frame sections to each other.

Figure 10:
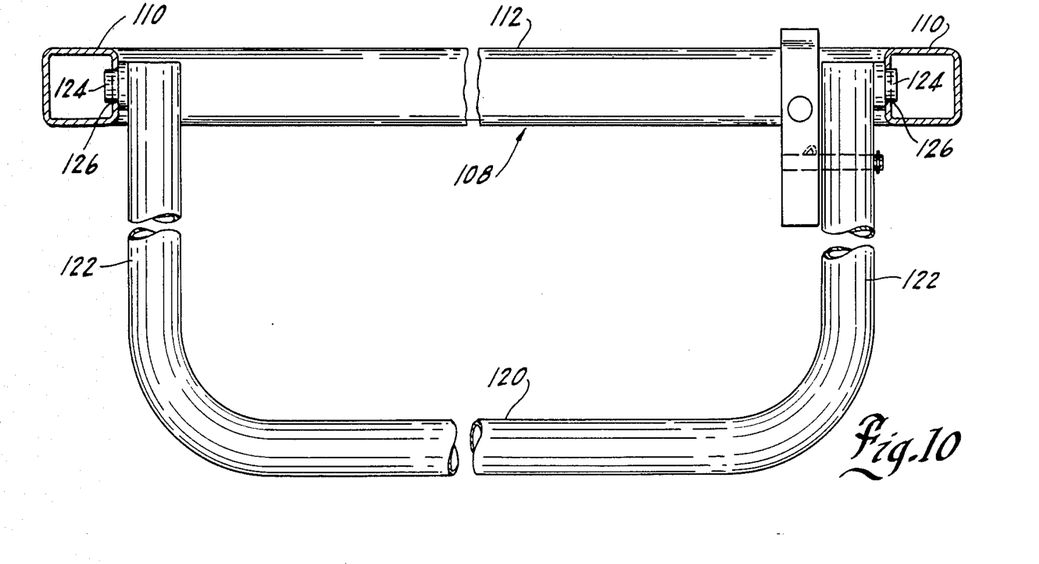
FIG. 10 is a plan view of a handle structure shown in FIG. 7.

The side struts 58, 60 and 110 are preferably also constructed to receive a handle 120 as shown in FIGS. 7 and 10. The handle 120 is generally a U-shaped member having the side legs 122 spaced generally in accordance with the spacing between the opposed faces of the side struts 58 and 110. The legs 122 of the U-shaped handle terminate in laterally inwardly extending pivot pins 124. The arms can be deflected inwardly slightly to allow insertion between the side strut and alignment of the pivot pins 124 with side openings 126 in the opposed face of the frame side strusts 58 and 110.

In the embodiment of the invention in FIG. 7, the upper end portion of the side struts are shown with the container supports 112 in the form of suitable L-shaped ledge units 112 for securing of a smaller container 114 resting between the side frames within the upper section 108. The ledge units 112 are secured to the face of the strut with an outwardly projecting ledge 130 including an upstanding support pin 132 and the container, or other member, is provided with corresponding openings 134 in the bottom wall or ledge.

Limited adjustment of the position of the units 112 can also be provided by constructing and mounting them as a removable element. For example, unit 112 may be formed with a pin-type support with spaced rear projection 134, 136 for insertion in the manner of hook units secured in a peg board. The side struts are provided with appropriately spaced openings 138 to receive the correspondingly spaced projections 134, 136 and adapted to mate therewith with an interlocking fit. Loading of the units 112 tends to bind the unit to the strut to firmly support the container 114 or other load.

Figure 11:
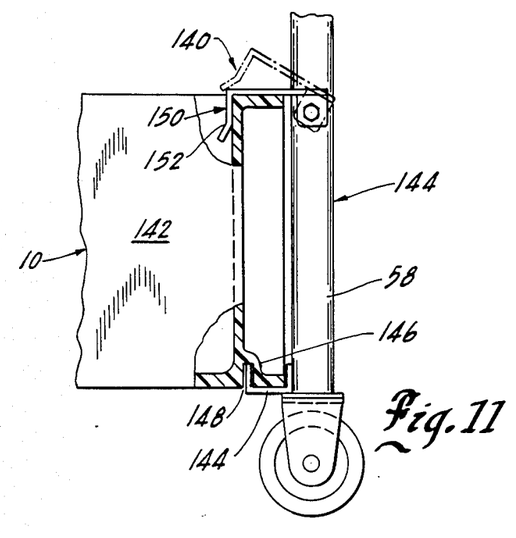
FIG. 11 is a fragmentary sectional view illustrating a further securement and retaining means.

In FIG. 11, a further releasable securement unit 140 is shown. The unit 140 is an interfering fit retaining unit and is illustrated for securing the container 142 to the frame 144. As in FIG. 1, the bottom of the container 142 rests on a transverse strut 144 and interlock thereto.

An alternative bottom strut 144 is shown in FIGS. 11 which includes a generally U-shaped channel member. The channel member is secured to the two side struts, and opens upwardly with the one vertical wall abutting to and firmly secured as by welding, or by releasable bolt units for adjustable location on the struts to the side struts just above the wheel support structures. The channel projects outwardly with the parallel outer strut wall 146 extending upwardly.

The container 142 is formed with a bottom ledge having a recess or opening 148 which mates with the outer wall in the assembled position to again lock the container in place.

The upper securement unit 140 includes a hook member 150 pivoted to the side member or struts of the frame, with the depending outer lip 152 located to extend into the container 142 immediately adjacent the inner wall of the container 142, as shown in FIG. 11. The length of the strut wall 146 is selected such that lifting of the container with the hook member 150 in the securing position hook member 150 and the upper end of the container 142 prior to the container clearing the upper end of the wall 146, as shown in phantom in FIG. 11. Thus, the hook member must be positively pivoted to the release position. Again, the hook member may be individual hook members secured to the side struts of the frame, and L-shaped plate pivoted between the side frames or the like.

The total kit assembly of this embodiment as well as the prior embodiments can be readily transported in a trunk of a conventional automobile or other vehicle between working locations. Thus for example, service people such as electricians, plumbers and the like have a considerable quantities of tools, equipment and the like to transport. Once at a job site, it would be desirable to have a simple cart transport unit for transporting of the tools and materials. Similarly, service people for ventilating equipment and other environmental activities require movement of the personnel along with their tools and equipment. Commercial salesmen often are required to transport their wares and goods not only from an automobile but within a given store or other customer locations. A simple break-away and readily on-site assembly transport kit unit simplifies and permits more convenient and ready transport of their goods.

All of the features disclosed in the present papers are claimed as being essential to the invention insofar as they are novel either singly or in combination relative to the prior art.

Various modes of carrying out the invention are contemplated as being within the scope of the following claims particularly pointing out and distinctly claiming the subject matter which is regarding as the invention.

I claim:

1. A transport device comprising a first essentially rectangular frame having at least one flat side (12), a second essentially rectangular frame having at least, one flat side, separate wheel means (14) attached to the lower end of said first frame and to the lower end of said second frame for movement of said frames, each of said frames having a lower container support means and an upper container support means having container securement means, and at least one container (10) having a first mounting side with a bottom edge located on said lower container support means of said first frame and a top edge for engagement with said container securement means for detachably securing said container to said one flat side of said first frame and said one container having a second spaced mounting side with a bottom edge located on said lower container support means of said second frame and a top for engagement with said container securement means for detachably securing said container to said one flat side of said second frame, each of said container securement means including a pair of L-shaped retaining hooks angled by approximately 90°, said pair of retaining hooks being mounted on opposite sides of said frame (12) for pivoting motion about an axis (28) extending approximately transversely of the frame, said retaining hooks, while in container-retaining position, having a horizontally extending side resting on the top edge of said container and a downwardly depending side extending into said container, and resilient means connected to each retaining hook for selectively holding said retaining hook in either a container-retaining position or a container-release position.

2. The device as claimed in claim 1, wherein said lower container support means is formed by a support strut (16) which extends transversely across the frame and projects beyond the plane thereof, said strut extending preferably across the entire frame width.

3. The device as claimed in claim 1, wherein each mounting side of said container includes a straight and flat bottom edge and each of said one flat sides of said frames (12) includes at least one longitudinal and at least one transverse strut, said transverse strut simultaneously being a container support means for said straight and flat container bottom edge (18), said bottom edge and said strut including offset interengaging means to limit lateral movement therebetween.

4. The device as claimed in claim 1 wherein each of said flat sides of said frames (12) is formed of at least two mutually spaced longitudinal struts (30, 32) extending approximately parallel to each other and of at least two transverse struts (16, 34 and/or 35) extending transversely to the former and likewise mutually spaced from each other, one of said bottom transverse struts (16) forming a container support means for the container bottom edge (18).

5. The device as claimed in claim 1 wherein at least a second container is disposed in vertically stacked relationship to said first container between said frames (12).

6. The device as claimed in claim 1, wherein a connecting slab (38) is secured to the upper portions of both said frames (12) and holds said frames in mutually spaced relationship.

7. The device as claimed in claim 1 wherein said wheel means are each mounted for pivoting movement about an upright axis.

8. The device as claimed in claim 1 wherein said lower container support means for the container lower end (20) is disposed for level adjustment to thereby vary the mutual spacing along the frame.

9. The device of claim 1 wherein said upper container securement means is disposed for level adjustment to thereby vary the mutual spacing along the frame.

10. A transport device comprising a first essentially rectangular frame having at least one flat side (12), a second essentially rectangular frame having at least one flat side, separate wheel means (14) attached to said first frame and to the lower edge of said second frame for movement of said frames, each of said frames including an upper frame section and a lower frame section, releasable connecting means joining said frame sections, said lower frame section having a lower container support means and an upper container securement means, and at least one container (10) having a first mounting side with a bottom edge located on said lower container support means of said first frame and a top edge for engagement with said container securement means for detachably securing said container to the securement means of said lower frame section of said first frame and said one container having a second spaced mounting side with a bottom edge located on said lower container support means of said second frame and a top edge for engagement with said container securement means for detachably securing said container to the lower frame section of said second frame, said upper frame sections of said first which are second frames having support means and adapted to support a member spanning the distance between said upper frame sections, wherein said lower container support means is formed by a support strut (16) which extends transversely across the frame, said container securement means includes a pair of L-shaped retaining hooks pivotally mounted on opposite sides of said lower frame section, said retaining hooks, while in a container-retaining position, having a horizontally extending side resting on the top edge of said container and a downwardly depending side extending into said container, and resilient means connected to each retaining hook for selectively holding said retaining hook in either a container-retaining position or a container-release position.

11. The device as claimed in claim 10 wherein each of said frame sections is formed of at least two mutually spaced longitudinal side struts extending approximately parallel to each other and of at least one transverse strut extending transversely to the side struts, said transverse strut of said lower frame section forming said container support means for the container bottom edge.

12. The device as claimed in claim 11 wherein said lower frame section includes a section strut disposed in vertically spaced relationship to said first strut between said side struts.

13. The device as claimed in claim 12, wherein said second strut of said lower frame section includes said container securement means, said container securement means including a pivoting member for releasable engagement with the upper end of said container.

* * * * *

UNITED STATES PATENT AND TRADEMARK OFFICE
CERTIFICATE OF CORRECTION

PATENT NO. : 4,790,549
DATED : December 13, 1988
INVENTOR(S) : Bjorn Armand

It is certified that error appears in the above-identified patent and that said Letters Patent is hereby corrected as shown below:

IN THE CLAIMS: Col. 7, line 54, after "least" delete "," (comma); Col. 7, line 60, after "means" delete "," (comma); Col. 8, line 8, after "in" insert ---a---; Col. 8, line 9, after "position" delete "," (comma); Col. 8, line 59, after "to" insert ---the lower end of---; Col. 8, line 60, delete "edge" and substitute therefor ---end---; Col. 9, lines 2-3, delete "securement means of said"; Col. 9, line 10, delete "which are" and substitute therefor ---and---; Col. 9, line 11, delete "and" and substitute therefor ---which are---.

Signed and Sealed this

Third Day of October, 1989

Attest:

DONALD J. QUIGG

Attesting Officer

Commissioner of Patents and Trademarks